(12) United States Patent
O'Dwyer et al.

(10) Patent No.: US 12,261,963 B2
(45) Date of Patent: Mar. 25, 2025

(54) ASSET MANAGEMENT IDENTIFICATION KEY

(71) Applicant: INTERNATIONAL BUSINESS MACHINES CORPORATION, Armonk, NY (US)

(72) Inventors: Alan Thomas O'Dwyer, Norwalk, CT (US); John Guckian, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/804,921

(22) Filed: Jun. 1, 2022

(65) Prior Publication Data

US 2023/0396443 A1 Dec. 7, 2023

(51) Int. Cl.
*H04L 9/32* (2006.01)
*H04L 9/00* (2022.01)
*H04L 9/40* (2022.01)

(52) U.S. Cl.
CPC .......... *H04L 9/3247* (2013.01); *H04L 9/3239* (2013.01); *H04L 9/3263* (2013.01); *H04L 9/50* (2022.05); *H04L 63/0876* (2013.01)

(58) Field of Classification Search
CPC ....... H04L 9/3247; H04L 9/50; H04L 9/3239; H04L 9/3263; H04L 63/0876
See application file for complete search history.

(56) References Cited

U.S. PATENT DOCUMENTS

| | | | |
|---|---|---|---|
| 7,257,834 B1 * | 8/2007 | Boydstun | G06F 21/31 707/999.009 |
| 8,397,128 B1 | 3/2013 | Alonzo | |
| 9,436,820 B1 * | 9/2016 | Gleichauf | H04L 63/02 |
| 9,876,775 B2 | 1/2018 | Mossbarger | |
| 10,261,711 B1 * | 4/2019 | Pasirstein | H04L 9/0637 |
| 11,032,293 B2 | 6/2021 | Biyani | |
| 11,159,333 B2 | 10/2021 | Li | |
| 11,249,977 B2 | 2/2022 | Kohli | |
| 2009/0300711 A1 * | 12/2009 | Tokutani | G06F 21/6218 726/1 |
| 2010/0161969 A1 * | 6/2010 | Grebovich | H04L 9/3247 713/176 |

(Continued)

FOREIGN PATENT DOCUMENTS

| CN | 112560096 A | 3/2021 |
|---|---|---|
| CN | 113901140 A | 1/2022 |

OTHER PUBLICATIONS

Baker, JM. et al., "The Marketing Book", Sixth Edition, ISBN:978-0-7506-8566-5, 2020, 683 Pgs, Downloaded Apr. 5, 2022.

(Continued)

*Primary Examiner* — Daniel B Potratz
*Assistant Examiner* — Matthias Habtegeorgis
(74) *Attorney, Agent, or Firm* — Stosch Sabo

(57) ABSTRACT

Described are techniques for asset management using an asset management identification key. The techniques include populating, based on input to a front-end portal, a plurality of fields including a plurality of attributes and a serial number of a device. The techniques further include hashing each of the plurality of fields. The techniques further include hashing a contiguous sequence of the hashed plurality of fields to generate an asset management identification key. The techniques further include transmitting the asset management identification key to a blockchain and authenticating the device using the asset management identification key stored on the blockchain.

20 Claims, 7 Drawing Sheets

(56) References Cited

U.S. PATENT DOCUMENTS

| | | | | |
|---|---|---|---|---|
| 2013/0212650 | A1* | 8/2013 | Dabbiere | H04L 63/10 |
| | | | | 726/4 |
| 2017/0272336 | A1* | 9/2017 | Johnstone | H04L 43/0817 |
| 2018/0308134 | A1* | 10/2018 | Manning | G06Q 30/0277 |
| 2019/0109877 | A1* | 4/2019 | Samuel | H04W 4/70 |
| 2019/0258991 | A1 | 8/2019 | Kelly | |
| 2020/0210414 | A1* | 7/2020 | Yang | H04L 9/0637 |
| 2020/0372835 | A1* | 11/2020 | Li | G06F 21/16 |
| 2021/0152365 | A1* | 5/2021 | Nosseir | H04L 9/321 |
| 2021/0349836 | A1* | 11/2021 | Benedict | G06F 12/1433 |
| 2022/0005578 | A1* | 1/2022 | Neumann | G06F 16/248 |
| 2022/0138181 | A1* | 5/2022 | Irazabal | G06F 16/2379 |
| | | | | 707/703 |
| 2022/0216997 | A1* | 7/2022 | Davies | H04L 9/3239 |

OTHER PUBLICATIONS

Derbinsky., "Entity-Relationship (ER) Diagrams", Northeastern University, CS3200—Database Design, Spring 2018, (Feb. 11, 2018), 57 Pgs.

Disclosed Anonymously et al., "Methodology and Procedure for Secure Granular Authorization and Audit Implementation in Distributed Enterprise Computing Environment", ip.com Prior Art Database Technical Disclosure, IPCOM000237293D, Jun. 11, 2014, 18 Pgs.

Disclosed Anonymously et al., "A Method for Secure De-Centralized Resource Management", ip.com Prior Art Database Technical Disclosure, IPCOM000243992D, Nov. 4, 2015, 18 Pgs.

Disclosed Anonymously et al., "System for Dynamic Enablement Content Generation and Responsible Asset Reuse", ip.com Prior Art Database Technical Disclosure, IPCOM000264905D, 6 Pgs, Feb. 5, 2021.

Helpnet Security;, "Organizations Have Limited Ability to View User Logs and Audit User Activity", Apr. 5, 2022, 6 pgs, <https://www.helpnetsecurity.com/2021/11/08/user-activity-visibility/>.

Mell et al., "The NIST Definition of Cloud Computing", National Institute of Standards and Technology, Special Publication 800-145, Sep. 2011, 7 pages.

Notification of transmittal of the International Search Report and the Written Opinion of the International Searching Authority or the Declaration for Application PCT/CN2023/085609, Jun. 25, 2023, 7 pages.

* cited by examiner

ASSET MANAGEMENT IDENTIFICATION KEY

BACKGROUND

The present disclosure relates to attribution, and, more specifically, to an asset management identification key capable of providing authentication and/or attribution for a combination of people, resources, and/or assets.

Asset management can refer to accurately monitoring location, ownership, status, and/or other attributes of various items and/or resources. In organizations, asset management can be used to inventory devices, their owners, and their accesses. Accurate device inventory is needed for compliance, security, efficiency, and auditability, among other factors.

SUMMARY

Aspects of the present disclosure are directed toward a computer-implemented method comprising populating, based on input to a front-end portal, a plurality of fields including a plurality of attributes and a serial number of a device. The method further comprises hashing each of the plurality of fields and hashing a contiguous sequence of the hashed plurality of fields to generate an asset management identification key. The method further comprises transmitting the asset management identification key to a blockchain. The method further comprises authenticating the device using the asset management identification key stored on the blockchain.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
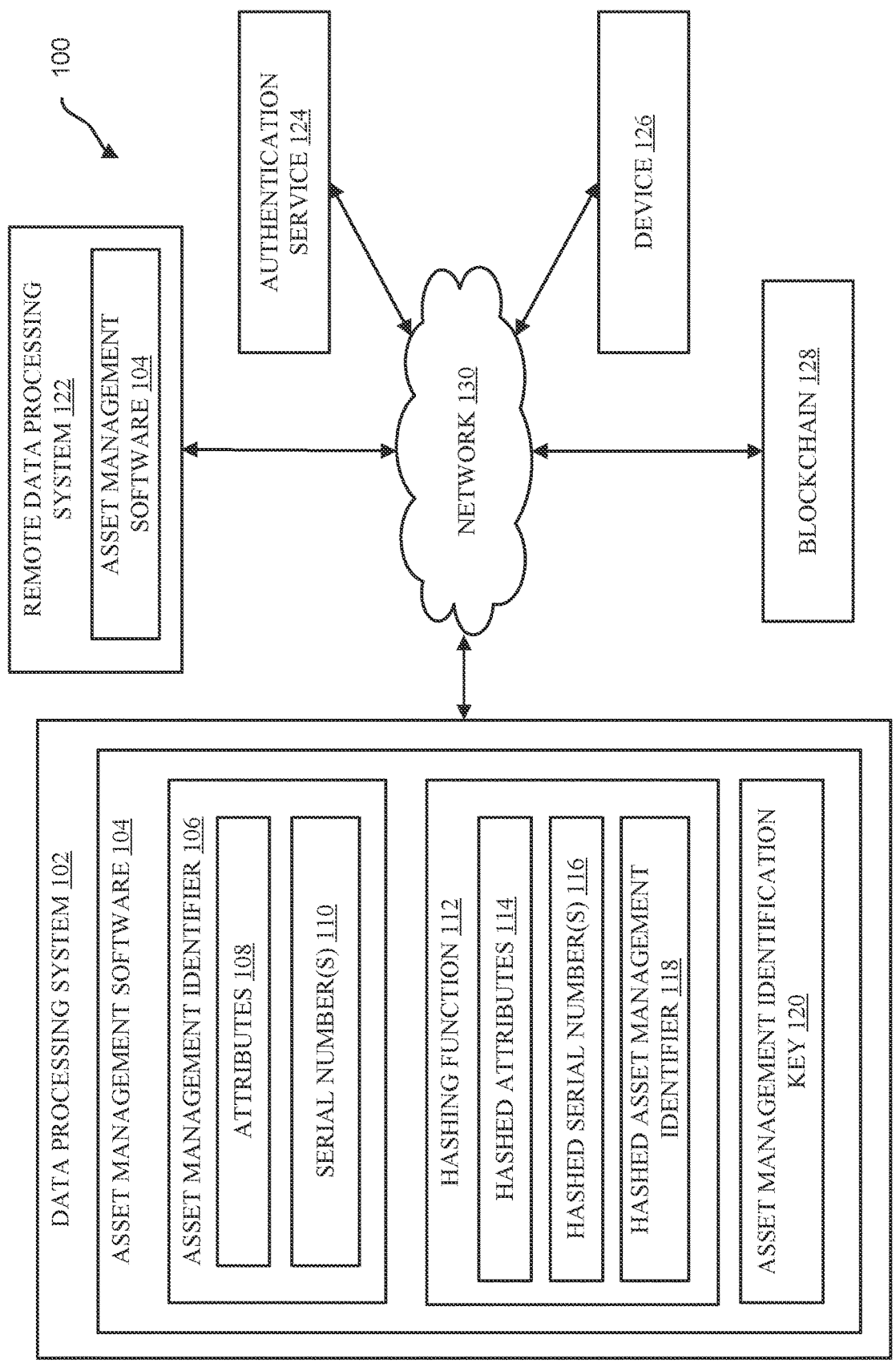
FIG. 1 illustrates a block diagram of an example computational environment implementing asset management software, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward attribution, and, more specifically, to an asset management identification key capable of providing authentication and/or attribution for a combination of people, resources, and/or assets. While not limited to such applications, embodiments of the present disclosure may be better understood in light of the aforementioned context.

Organizations can experience difficulty monitoring statuses and/or histories of personnel, their assigned assets, and/or their permissioned resources in a single, reliable, and searchable data structure. As one example, such difficulties can manifest themselves in cybersecurity incidents, whereby security responders rely on outdated, unreliable, and/or unvalidated processes to collect user and/or device information related to a cybersecurity incident.

Aspects of the present disclosure are directed toward overcoming the aforementioned challenges. In some embodiments, aspects of the present disclosure generate and utilize an asset management identification key which can function as a unique identifier or signature for a combination if personnel, devices, resources, and/or permissions. Like a Vehicle Identification Number (VIN), the asset management identification key can comprise an alphanumeric identifier based on numerous attributes of its associated personnel, devices, resources, and/or permissions.

The asset management identification key can be generated for a person, a device, or another asset (e.g., software license, etc.). For example, the asset management identification key can be generated for each patient in a hospital where assets and/or resources can be temporarily assigned to the patient during a hospital stay and an ongoing record maintained of all the patient's hospital stays. As another example, the asset management identification key can be generated for each device owned by a company, where numerous employees can be simultaneously or sequentially associated with the device. Regardless of the specific implementation scheme, the asset management identification key can uniquely identify a combination of personnel, devices, resources, and/or permissions.

In some embodiments, the asset management identification key is generated using a front-end portal (e.g., a computer application) for inputting information and a back-end blockchain-managed database for providing a secure, auditable history of each asset management identification key. The front-end portal can be customized to include any number of fields related to different attributes customizable to different implementations.

An asset management identification key can be created based on a combination of user input attributes and/or auto-populated attributes. For example, for an employee of a company, such attributes (whether user input or auto-populated) can relate to a date of hire, a job title, a department, a device identifier, one or more resources, one or more permissions, and/or other auxiliary attributes (e.g., passwords, badge numbers, implementation-specific attributes, etc.).

In some embodiments, each field of the asset management identification key can be individually hashed, and a contiguous sequence of the hashed fields can then, itself, be hashed to generate the asset management identification key. In other embodiments, a contiguous sequence of the attribute fields can be hashed in its entirety to generate the asset management identification key.

The asset management identification key can ultimately be stored on a blockchain. Any subsequent changes to the asset management identification key (e.g., a job change, a new device, a name change, etc.) can result in an updated hash and the updated hash can be recorded in the blockchain, thereby providing an auditable, validated history of changes related to combinations of personnel, devices, resources, and/or permissions.

Any such changes made to the asset management identification key can be made through the front-end portal or automatically applied based on automated interactions between the front-end portal and one or more applications and/or databases associated with an organization. For example, if an employee's job title is updated in an internal database, aspects of the present disclosure can be configured to interact with the internal database to identify the changed job title, retrieve the new job title, and update the job title in the asset management identification key.

The asset management identification key can realize numerous advantages such as, but not limited to, (i) timely discovery of validated information related to a person or device (e.g., responding to a cybersecurity incident), (ii) ease of auditability, (iii) historical attribution (e.g., ownership changes of devices, etc.), (iv) improved asset and/or access tracking (e.g., for stolen or lost devices), and/or (v) no use of Personally Identifiable Information (PII) or Sensitive Personal Information (SPI) (e.g., the asset management identification key is based on a unique combination of personnel, devices, resources, and/or permissions, where the combination creates a unique identifier without the need for PII or SPI such as a social security number, a full name, a date of birth, etc.).

Referring now to the figures, FIG. 1 illustrates a block diagram of an example computational environment 100 implementing asset management software 104, in accordance with some embodiments of the present disclosure. The computational environment 100 includes a data processing system 102, remote data processing system 122, authentication service 124, device 126, and blockchain 128 communicatively coupled to one another via a network 130. The network 130 can be a local area network (LAN), a wide area network (WAN), an intranet, the Internet, or any other network 130 or group of networks 130 capable of continuously, semi-continuously, or intermittently connecting (directly or indirectly) the aforementioned components together.

Asset management software 104 can be executed on the data processing system 102. In some embodiments, the asset management software 104 is downloaded to the data processing system 102 from a remote data processing system 122. In other embodiments, some aspects of the asset management software 104 are implemented by the data processing system 102 and other aspects of the asset management software 104 are implemented by the remote data processing system 122.

The asset management software 104 can be configured to generate an asset management identifier 106 comprised of one or more attributes 108 and/or one or more serial numbers 110. The attributes 108 can be related to personnel data (e.g., name code, date code, role code, etc.), resources data (e.g., a Virtual Private Network (VPN) certificate, etc.), and/or permissions data (e.g., a user role definition of a Role-Based Access Control (RBAC) policy, etc.). The serial numbers 110 can be identifiers associated with one or more devices. For example, the serial number 110 can be a Media Access Control (MAC) address associated with a device. The attributes 108 and the serial numbers 110 can be automatically generated (e.g., using Application Programming Interface (API) calls to one or more connected applications, databases, etc.), or manually populated based on user input to a user portal (e.g., an application with a Graphical User Interface (GUI) implemented on the data processing system 102). The asset management identifier 106 can store the plurality of fields including attributes 108 and serial numbers 110 as distinct features of an instance in a table, as components of a data array, as components of a vector, or as a contiguous sequence with indicators (e.g., underscores, periods, etc.) separating adjacent fields.

Once generated, the asset management identifier 106 is provided to a hashing function 112. The hashing function 112 can implement any hashing function now known or later developed. Hashing function 112 can be configured to receive as input data of variable size and generate as output, a hash, hash code, hash value, or digest of fixed size. Hashing function 112 can employ any number of hashing techniques now known or later developed, such as, for example, identity hash functions, trivial hash functions, folding hash functions, mid-squares hash functions, division hash functions, algebraic coding hash functions, unique permutation hash functions, multiplicative hash functions, Fibonacci-type hash functions, Zobrist-type hash functions, radix conversion hash functions, rolling hash functions, and/or other hash functions. In some embodiments, the hashing function 112 can include, but is not limited to, BLAKE (e.g., BLAKE-256, BLAKE-512, BLAKE2s, BLAKE2b, BLAKE2X, BLAKE3), Elliptic Curve Only Hash (ECOH), Fast Syndrome-Based (FSB) hash, GOST, Grostl, HAS-160, HAVAL, JH, LSH, Message Digest (MD) hash (e.g., MD2, MD4, MD5, MD6), RadioGatun, Research and Development in Advanced Communications Technologies in Europe (RACE) Integrity Primitives Evaluation Message Digest (RIPEMD) (e.g., RIPEMD-128, RIPEMD-160, RIPEMD-320), Secure Hash Algorithm (SHA) (e.g., SHA-1, SHA-224, SHA-256, SHA-384, SHA-512, SHA-3), Skein, Snefru, Spectral Hash, Streebog, SWIFFT, Tiger, and Whirlpool, among other hash functions.

The hashing function 112 can be individually applied to the attributes 108 to generate hashed attributes 114 and individually applied to the serial numbers 110 to generate hashed serial numbers 116. The hashing function 112 can then be applied to a contiguous sequence of the hashed attributes 114 and the hashed serial numbers 116 to generate a hashed asset management identifier 118. In other embodiments, the hashing function 112 can be applied directly to the asset management identifier 106.

The asset management software 104 can be further configured to generate an asset management identification key 120. In some embodiments, the asset management identification key 120 is the hashed asset management identifier 118. In other embodiments, the asset management identification key 120 is a modified variation of the hashed asset management identifier 118. For example, when modified, the asset management identification key 120 can append a value to the hashed asset management identifier 118 indicating a liveness (e.g., active, expired, retired, lost, etc.) of the asset management identification key 120 or indicating another feature, condition, or state.

The asset management identification key 120 can be transmitted to a blockchain 128. The blockchain 128 can represent a public, private, or hybrid blockchain implemented on a centralized or decentralized network. The blockchain 128 can be used to securely store an auditable record for all asset management identification keys 120, thereby providing accurate and trusted current and past data for different asset management identification keys 120 (that can represent unique combinations of personnel, resources, and permissions).

Meanwhile, a device 126 associated with the asset management identification key 120 (e.g., a particular computer associated with a particular individual) can request authentication via an authentication service 124. Authentication service 124 can retrieve information associated with the asset management identification key 120 from the blockchain 128 and use the retrieved information, together with information provided by the device 126, to authenticate the device 126. As one example, the authentication service 124 can utilize public-private key pairs and/or digital signatures to authenticate the device 126 using the asset management identification key 120.

The data processing system 102, the remote data processing system 122, authentication service 124, and the device 126 can be any computer, server, mainframe, virtual machine (VM), tablet, notebook, smartphone, other computer hardware, multiples of the aforementioned, and/or combinations of the aforementioned. As will be appreciated by one skilled in the art, FIG. 1 is representative of some embodiments of the present disclosure but should not be construed as limiting. In other embodiments, more or fewer similar or dissimilar components than the components shown in FIG. 1 can be present. Furthermore, in various embodiments, the components shown in FIG. 1, if they are present at all, can be combined together into unified components or separated into discrete components.

Figure 2:
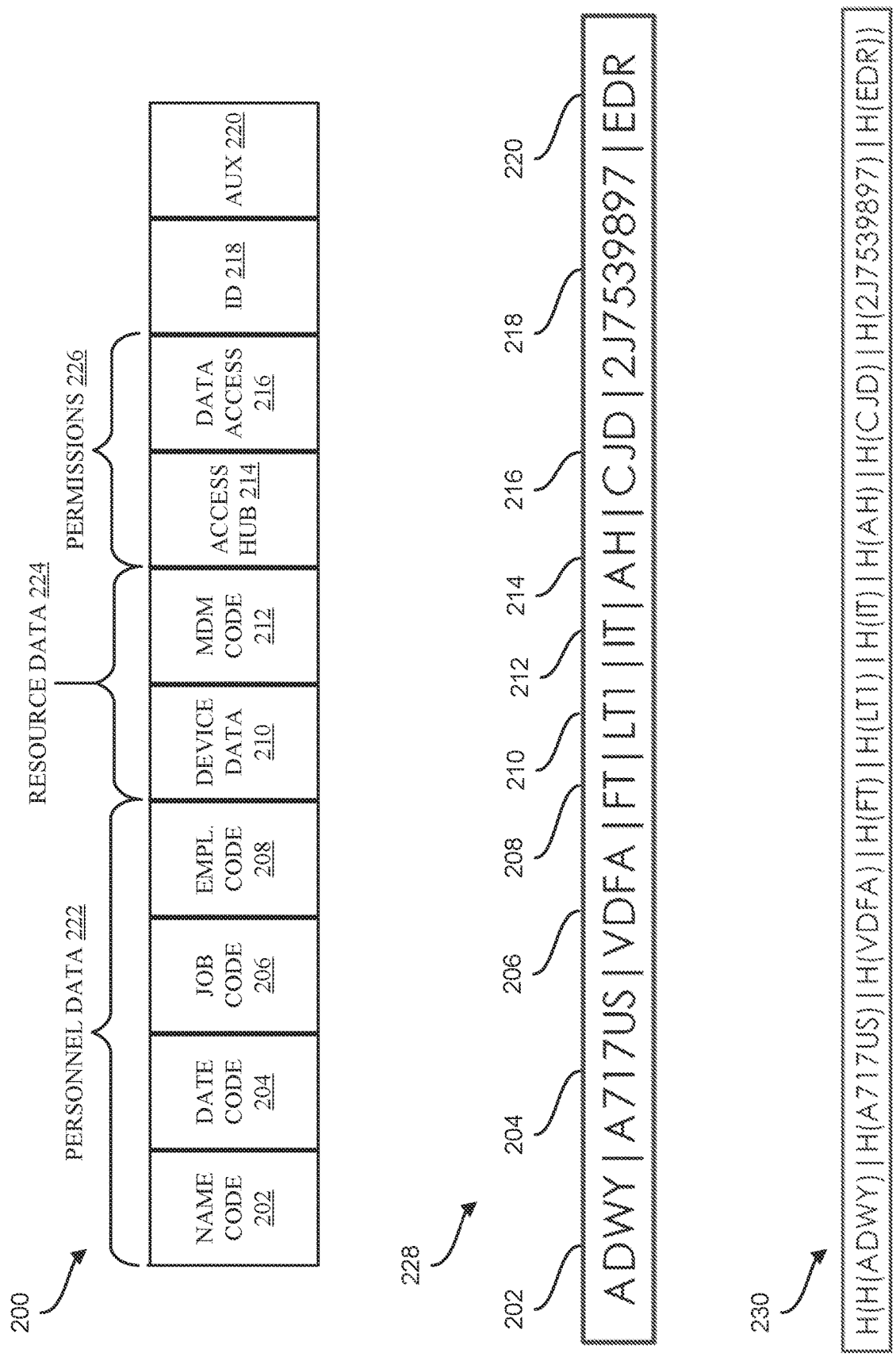
FIG. 2 illustrates aspects of an asset management identification key, in accordance with some embodiments of the present disclosure.

FIG. 2 illustrates aspects of an asset management identification key, in accordance with some embodiments of the present disclosure. Table 200 illustrates example inputs of an asset management identification key. In some embodiments, table 200 includes example attributes 108 and example serial numbers 110 of FIG. 1 for a given asset management identification key. Table 200 includes name code 202, date code 204, job code 206, employment code 208, device data 210, Mobile Device Management (MDM) code 212, access hub 214, data access 216, identifier (ID) 218, and auxiliary 220 (e.g., a miscellaneous, customized, or other field). In some embodiments, components such as name code 202, date code 204, job code 206, employment code 208 can be generally referred to as personnel data 222. Likewise, in some embodiments, components such as device data 210 and MDM code 212 can be referred to as resource data 224 and components such as access hub 214 and data access 216 can be referred to as resource permissions 226.

Name code 202 can be, for example, a first letter from a first name and the first three letters from a last name, or some other set of characters related to a name that is not the name itself. Advantageously, using features of a name in name code 202 without using a whole or actual name contributes to the uniqueness of a particular asset management identification key without requiring PII or SPI information. Date code 204 can refer to a date such as a start date, an end date, an event date, a creation date, or another type of date. The date code 204 can be in numeric or alphanumeric format.

For example, date code 204 can be in a format of (i) an alphabetical identifier mapped to a year; (ii) a numeric sequence related to a month/day combination; and (iii) an alphabetical identifier of geography.

Job code 206 can be an alphabetical, numeric, or alphanumeric identifier related to a department, organization, function, or the like. Employment code 208 can refer to a type of employment for embodiments related to Human Resources (e.g., full-time, part-time, contractor, etc.). Collectively, name code 202, date code 204, job code 206, and employment code 208 can be generally referred to as personnel data 222. However, personnel data 222 can include more information, less information, and/or different information than the name code 202, date code 204, job code 206, and employment code 208 illustrated in table 200 depending on the type of application of the asset management identification key. For example, in a hospital setting where asset management identification keys are used for patients, components may include dates related to in-patient stays, out-patient visits, and the like. As another example, in a manufacturing setting where asset management identification keys are used for equipment, a name code 202 can instead be used to represent a type of equipment, a model of equipment, and/or a version of equipment.

Table 200 further includes device data 210. Device data 210 can include, for example, serial numbers 110 described with respect to FIG. 1. Device data 210 can include a MAC address, a serial number, a model number, or another number associated with a particular device (e.g., device 126 of FIG. 1). Table 200 further includes MDM code 212 which can be used to configured VPN access or other network access for devices associated with device data 210. In some embodiments, device data 210 and MDM code 212 can collectively be referred to as resource data 224. However, resource data 224 can include more information, less information, and/or different information than the deice data 210 and MDM code 212.

Table 200 further includes access hub 214. Access hub 214 can be an auto-generated identifier related to a set of resources (e.g., intranets, shared drives, online applications, desktop applications, etc.). Table 200 further includes data access 216. Data access 216 can be, for example, a user-role of a RBAC-type access control policy. In some embodiments, access hub 214 and data access 216 can collectively be referred to as permissions 226. However, the permissions 226 can include more information, less information, and/or different information than the access hub 214 and data access 216.

Table 200 further includes ID 218. ID 218 can be any numeric, alphanumeric, alphabetical, and/or other symbolic representation of an identifier related to, for example, an individual, device, machine, event (e.g., audit), and the like. Table 200 further includes auxiliary 220 which can be a customized field that can optionally indicate, for example, a state (e.g., lost, stolen, compromised, active, etc.), an archived or deactivated asset management identification key, a badge number, a credential number, or another customized field.

FIG. 2 further illustrates an asset management identifier 228. In some embodiments, the asset management identifier 228 is consistent with the asset management identifier 106 of FIG. 1. The asset management identifier 228 includes, in un-hashed form, the name code 202, date code 204, job code 206, employment code 208, device data 210, MDM code 212, access hub 214, data access 216, ID 218, and auxiliary 220.

FIG. 2 further illustrates an asset management identification key 230. In some embodiments, the asset management identification key 230 is consistent with the hashed asset management identifier 118 and/or the asset management identification key 120. The asset management identification key 230 applies a hash function (H) to each component of the asset management identifier 228 and then applies the hash function (H) to the contiguous sequence of hashed components. Hash function (H) can be consistent with hashing function 112 of FIG. 1.

Figure 3:
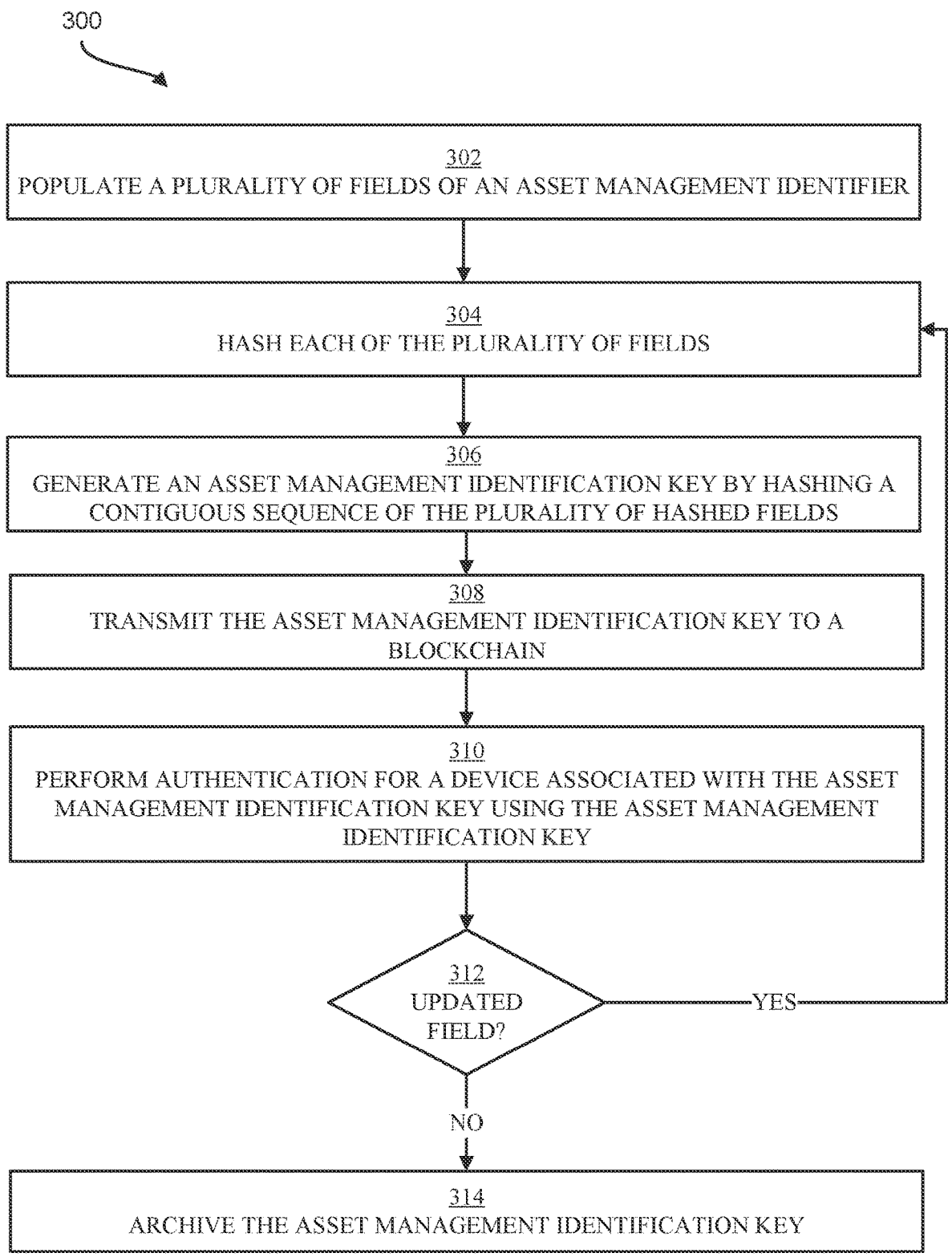
FIG. 3 illustrates a flowchart of an example method for using an asset management identification key, in accordance with some embodiments of the present disclosure.

FIG. 3 illustrates a flowchart of an example method 300 for using an asset management identification key, in accordance with some embodiments of the present disclosure. In some embodiments, the method 300 is implemented by, for example, a data processing system (e.g., data processing system 102 and/or remote data processing system 122 of FIG. 1), a computer, a processor, or another configuration of hardware and/or software.

Operation 302 includes populating a plurality of fields of an asset management identifier. In some embodiments, operation 302 includes automatically or manually populating one or more attributes 108 and/or serial numbers 110 of an asset management identifier 106 as described with respect to FIG. 1. Operation 302 can be performed by accessing a front-end portal (e.g., a web-based or desktop-based application) and/or by automatically retrieving such information using one or more API calls to connected applications, databases, and/or websites.

Operation 304 includes hashing each of the plurality of fields. In some embodiments, operation 304 generates hashed attributes 114 and hashed serial numbers 116 as described with respect to FIG. 1. Operation 304 can utilize any of the hashing functions previously described with respect to hashing function 112 of FIG. 1.

Operation 306 includes generating an asset management identification key by hashing a contiguous sequence of the plurality of hashed fields. In some embodiments, operation 306 generates the hashed asset management identifier 118 and/or the asset management identification key 120 as described with respect to FIG. 1. Operation 306 can utilize any of the hashing functions previously described with respect to hashing function 112 of FIG. 1.

Operation 308 includes transmitting the asset management identification key to a blockchain (e.g., blockchain 128 of FIG. 1). Operation 310 includes performing authentication for a device associated with the asset management identification key using the asset management identification key. In some embodiments, operation 310 utilizes an authentication service (e.g., authentication service 124 of FIG. 1) that is communicatively coupled to the blockchain storing the asset management identification key. As used herein, performing an authentication operation can include, but is not limited to, a login or logon operation, an access request (e.g., to a website, database, or any other virtual or physical data processing system), a read request, a write request, a transaction, or any other type of event requiring authentication, validation, and/or attribution of a profile, individual, and/or device. In some embodiments, operation 310 uses the asset management identification key as a public key of a public-private key pair, a private key of a public-private key pair, and/or a digital signature to perform the authentication.

Operation 312 includes determining of a field of the plurality of fields is updated. If so (312: YES), the method 300 returns to operation 304 and re-hashes at least the updated field. The method 300 then proceeds to operation 306 and re-hashes the plurality of hashed fields including the re-hashed updated field. Operation 306 can thus generate an updated asset management identification key. In operation 308, the updated asset management identification key can be transmitted to the blockchain, and in operation 310, an authentication service can retrieve the updated asset management identification key to allow or deny an authentication request.

Referring back to 312, if no field is updated (312: NO), then the method 300 ultimately proceeds to operation 314 and archives the asset management identification key. The asset management identification key can be archived on the blockchain, or the asset management identification key can be withdrawn from, or deactivated on, the blockchain, and the data related to the asset management identification key can be transmitted to an archival storage medium (e.g., tape storage). In some embodiments, archiving the asset management identification key includes updating a field (e.g., auxiliary 220 of FIG. 2) to indicate a deactivated or archived status of the asset management identification key. Advantageously, archiving asset management identification keys can enable an organization to preserve a historical record of a combination of personnel, resources, and permissions which may be required for future audits, regulatory compliance, and/or other events.

Figure 4:
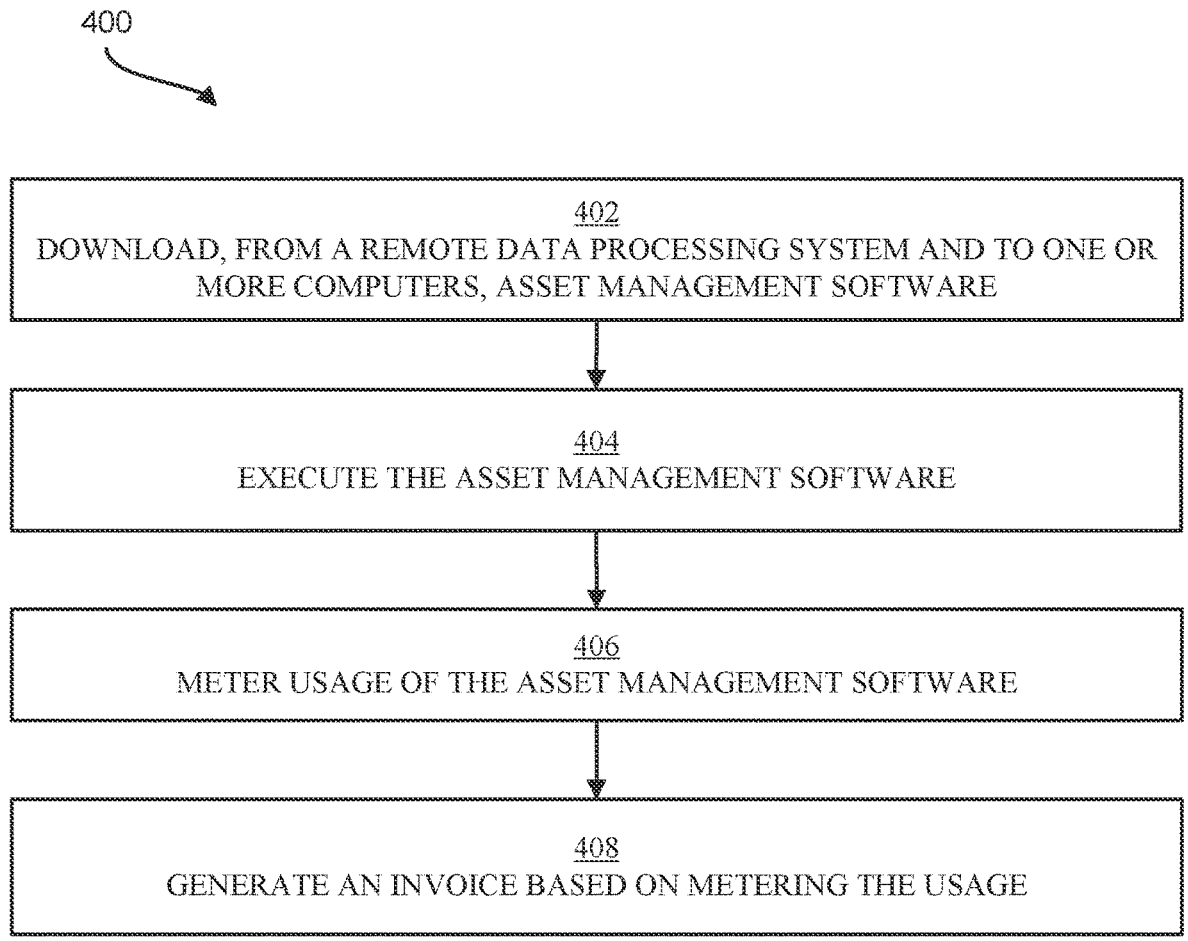
FIG. 4 illustrates a flowchart of an example method for downloading, deploying, metering, and billing usage of asset management software, in accordance with some embodiments of the present disclosure.

FIG. 4 illustrates a flowchart of an example method 400 for downloading, deploying, metering, and billing usage of asset management software 104, in accordance with some embodiments of the present disclosure. In some embodiments, the method 400 is implemented by a computer, a server, a processor, a data processing system (e.g., data processing system 102 and/or remote data processing system 122 of FIG. 1), or another configuration of hardware and/or software. In some embodiments, the method 400 occurs contemporaneously with the method 300 of FIG. 3.

Operation 402 includes downloading, from a remote data processing system (e.g., remote data processing system 122 of FIG. 1) and to one or more computers (e.g., data processing system 102 of FIG. 1), asset management software (e.g., asset management software 104 of FIG. 1). Operation 404 includes executing the asset management software. Operation 404 can include performing any of the methods and/or functionalities discussed herein. Operation 406 includes metering usage of the asset management software. Usage can be metered by, for example, an amount of time the asset management software is used, a number of workstations deploying the asset management software, an amount of resources consumed by implementing the asset management software, and/or other usage metering metrics. Operation 408 includes generating an invoice based on metering the usage.

Figure 5:
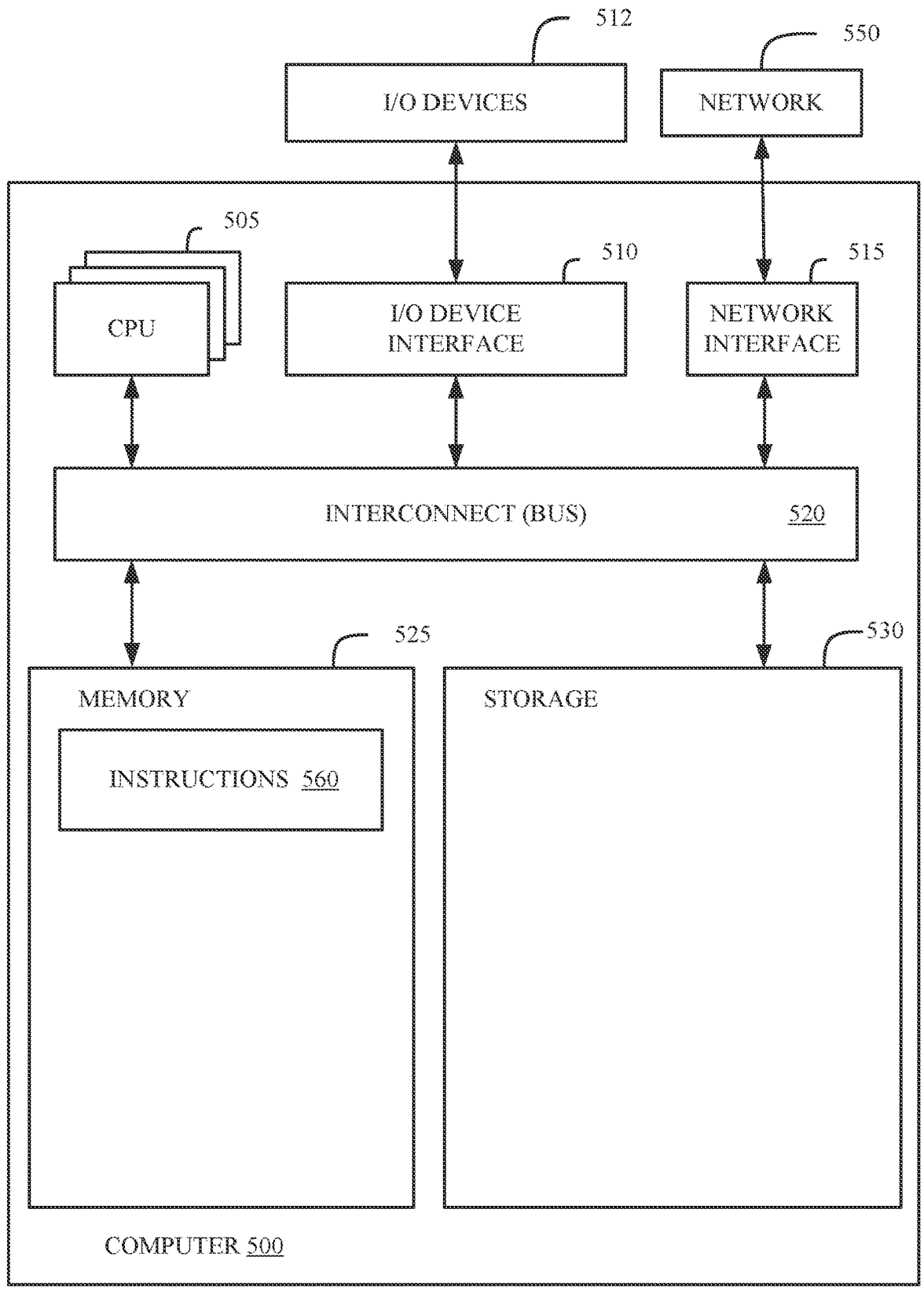
FIG. 5 illustrates a block diagram of an example computer, in accordance with some embodiments of the present disclosure.

FIG. 5 illustrates a block diagram of an example computer 500 in accordance with some embodiments of the present disclosure. In various embodiments, computer 500 can perform any or all portions of the methods described in FIGS. 3-4 and/or implement the functionality discussed in FIGS. 1-2. In some embodiments, computer 500 receives instructions related to the aforementioned methods and functionalities by downloading processor-executable instructions from a remote data processing system via network 550. In other embodiments, computer 500 provides instructions for the aforementioned methods and/or functionalities to a client machine (e.g., data processing system 102 of FIG. 1) such that the client machine executes the method, or a portion of the method, based on the instructions provided by computer 500. In some embodiments, the computer 500 is incorporated into (or functionality similar to computer 500 is virtually provisioned to) one or more entities illustrated in FIG. 1 and/or other aspects of the present disclosure.

Computer 500 includes memory 525, storage 530, interconnect 520 (e.g., a bus), one or more CPUs 505 (also referred to as processors herein), I/O device interface 510, I/O devices 512, and network interface 515.

Each CPU 505 retrieves and executes programming instructions stored in memory 525 or storage 530. Interconnect 520 is used to move data, such as programming instructions, between the CPUs 505, I/O device interface 510, storage 530, network interface 515, and memory 525. Interconnect 520 can be implemented using one or more buses. CPUs 505 can be a single CPU, multiple CPUs, or a single CPU having multiple processing cores in various embodiments. In some embodiments, CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of a random-access memory (e.g., static random-access memory (SRAM), dynamic random-access memory (DRAM), or Flash). Storage 530 is generally included to be representative of a non-volatile memory, such as a hard disk drive, solid state device (SSD), removable memory cards, optical storage, or flash memory devices. In an alternative embodiment, storage 530 can be replaced by storage area-network (SAN) devices, the cloud, or other devices connected to computer 500 via I/O device interface 510 or network 550 via network interface 515.

In some embodiments, memory 525 stores instructions 560. However, in various embodiments, instructions 560 are stored partially in memory 525 and partially in storage 530, or they are stored entirely in memory 525 or entirely in storage 530, or they are accessed over network 550 via network interface 515.

Instructions 560 can be computer-readable and computer-executable instructions for performing any portion of, or all of, the methods of FIGS. 3-4 and/or implement the functionality discussed in FIGS. 1-2. Although instructions 560 are shown in memory 525, instructions 560 can include program instructions collectively stored across numerous computer-readable storage media and executable by one or more CPUs 505.

In various embodiments, I/O devices 512 include an interface capable of presenting information and receiving input. For example, I/O devices 512 can present information to a user interacting with computer 500 and receive input from the user.

Computer 500 is connected to network 550 via network interface 515. Network 550 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
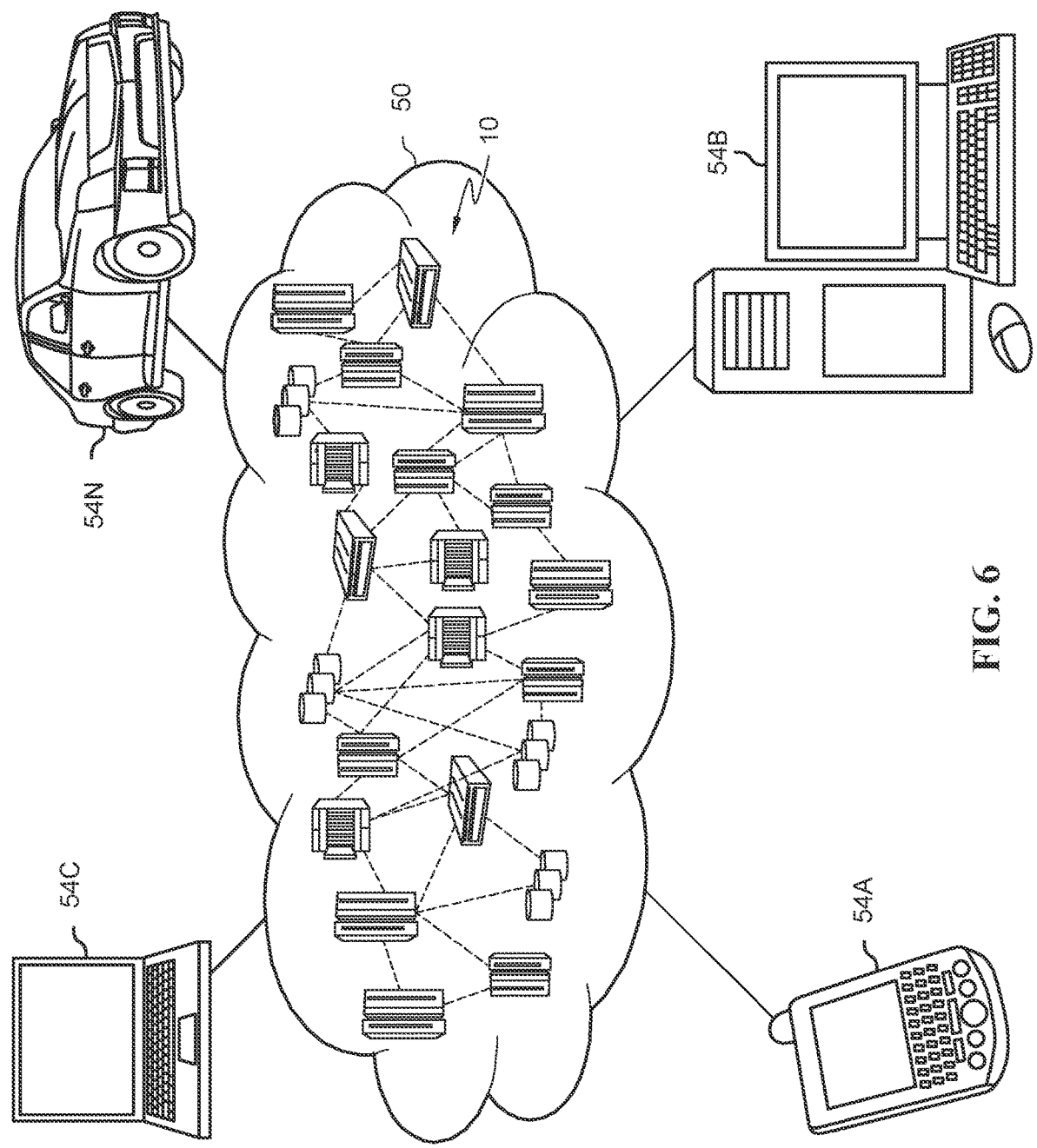
FIG. 6 depicts a cloud computing environment, in accordance with some embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
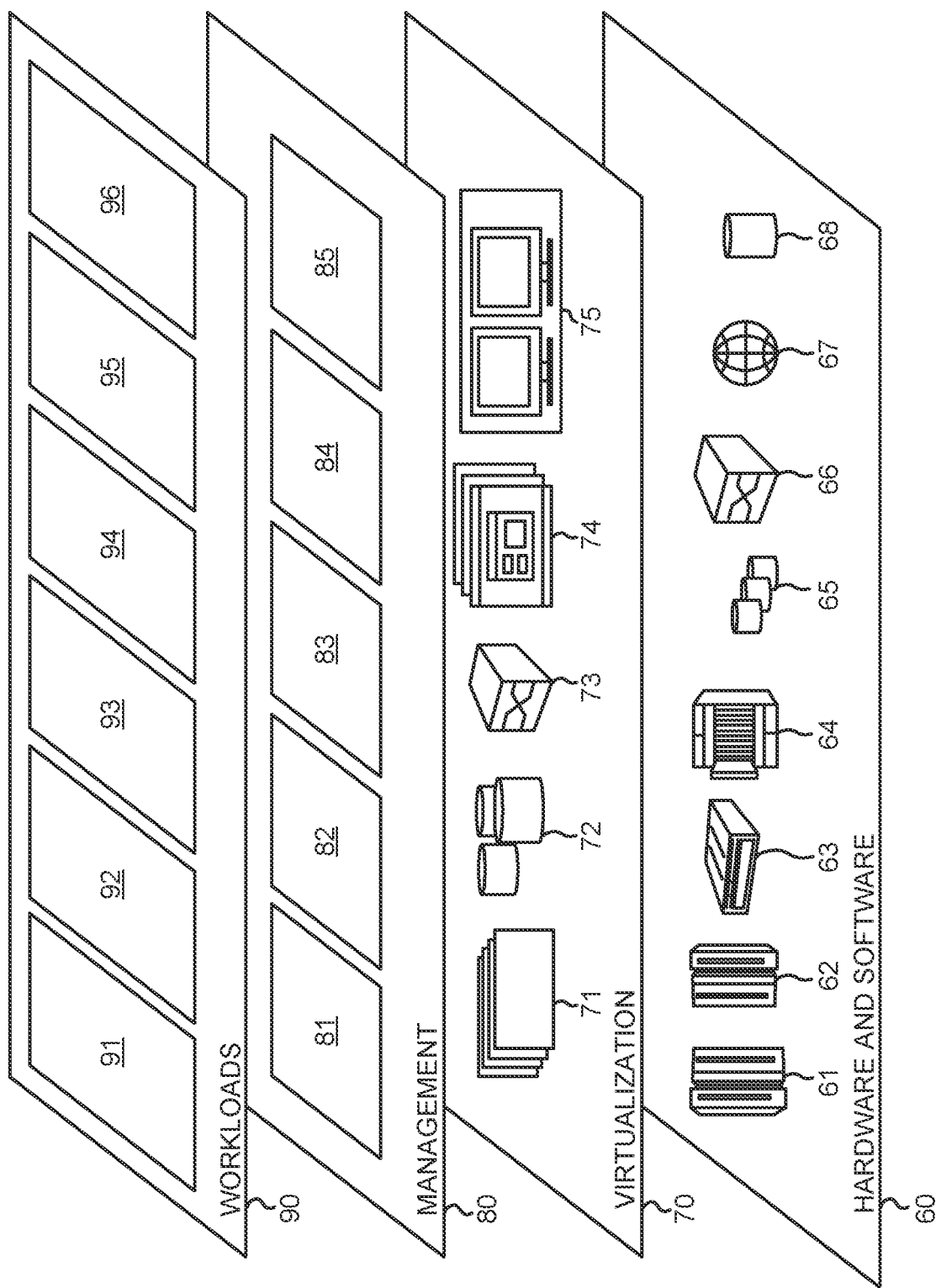
FIG. 7 depicts abstraction model layers, in accordance with some embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asset management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 560 of FIG. 5 and/or any software configured to perform any portion of the methods described with respect to FIGS. 3-4 and/or implement the functionality discussed in FIGS. 1-2 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes populating, based on input to a front-end portal, a plurality of fields including a plurality of attributes and a serial number of a device; hashing each of the plurality of fields; hashing a contiguous sequence of the hashed plurality of fields to generate an asset management identification key; transmitting the asset management identification key to a blockchain; and authenticating the device using the asset management identification key stored on the blockchain.

Example 2 includes the features of Example 1. In this example, the plurality of attributes comprises personnel data, resources data, and permissions data.

Example 3 includes the features of Example 2. In this example, the personnel data comprises a name code, a date code, and a role code.

Example 4 includes the features of any one of Examples 2 to 3. In this example, the resources data comprises a Virtual Private Network (VPN) certificate.

Example 5 includes the features of any one of Examples 2 to 4. In this example, the permissions data comprises a user role of a role-based access control (RBAC) policy.

Example 6 includes the features of any one of Examples 1 to 5. In this example, the serial number of the device comprises a Media Access Control (MAC) address of the device.

Example 7 includes the features of any one of Examples 1 to 6. This example further includes updating one of the plurality of fields; re-hashing the updated one of the plurality of fields; re-hashing the contiguous sequence of the hashed plurality of fields including the re-hashed updated one of the plurality of fields to generate an updated asset management identification key; and superseding the asset management identification key with the updated asset management identification key in the blockchain.

Example 8 includes the features of Example 7. In this example, the updated one of the plurality of fields reduces access privileges of the device, and wherein the method further comprises: initiating a subsequent authentication of the device using the updated asset management identification key, wherein the subsequent authentication fails based on the reduced access privileges of the device reflected in the updated asset management identification key.

Example 9 includes the features of any one of Examples 1 to 8. In this example, the method is performed by one or more computers according to software that is downloaded to the one or more computers from a remote data processing system. Optionally, the method further comprises: metering a usage of the software; and generating an invoice based on metering the usage.

Example 10 is a system. The system includes one or more computer readable storage media storing program instructions; and one or more processors which, in response to executing the program instructions, are configured to perform a method according to any one of Examples 1 to 9, including or excluding optional features.

Example 11 is a computer program product. The computer program product includes one or more computer readable storage media, and program instructions collectively stored on the one or more computer readable storage media, the program instructions comprising instructions configured to cause one or more processors to perform a method according to any one of Examples 1 to 9, including or excluding optional features.

What is claimed is:

1. A computer-implemented method comprising:
   populating, based on input to a front-end portal, a plurality of fields including a plurality of attributes and a serial number of a device;
   hashing each of the plurality of fields;
   hashing a contiguous sequence of the hashed plurality of fields to generate an asset management identification key;
   transmitting the asset management identification key to a blockchain;
   authenticating the device using the asset management identification key transmitted to the blockchain;
   updating one of the plurality of fields with information indicating a liveness of the asset management identification key, wherein the updating comprises updating an auxiliary field of the asset management identification key to indicate that the asset management identification key is archived;

re-hashing the updated one of the plurality of fields;
re-hashing the contiguous sequence of the hashed plurality of fields including the re-hashed updated one of the plurality of fields to generate an updated asset management identification key; and
superseding the asset management identification key with the updated asset management identification key in the blockchain, wherein the superseding causes the asset management identification key to be archived in the blockchain.

2. The method of claim 1, wherein the plurality of attributes comprises personnel data, resources data, and permissions data.

3. The method of claim 2, wherein the personnel data comprises a name code, a date code, and a role code.

4. The method of claim 2, wherein the resources data comprises a Virtual Private Network (VPN) certificate.

5. The method of claim 2, wherein the permissions data comprises a user role of a role-based access control (RBAC) policy.

6. The method of claim 1, wherein the serial number of the device comprises a Media Access Control (MAC) address of the device.

7. The method of claim 1, wherein the updated one of the plurality of fields reduces access privileges of the device, and wherein the method further comprises:
initiating a subsequent authentication of the device using the updated asset management identification key, wherein the subsequent authentication fails based on the reduced access privileges of the device reflected in the updated asset management identification key.

8. The method of claim 7, wherein the liveness of the asset management identification key is selected from a group consisting of: expired, retired, and lost.

9. The method of claim 1, wherein the method is performed by one or more computers according to software that is downloaded to the one or more computers from a remote data processing system, and wherein the method further comprises:
metering a usage of the software; and
generating an invoice based on metering the usage.

10. A system comprising:
one or more computer readable storage media storing program instructions; and
one or more processors which, in response to executing the program instructions, are configured to perform a method comprising:
populating, based on input to a front-end portal, a plurality of fields including a plurality of attributes and a serial number of a device;
hashing each of the plurality of fields;
hashing a contiguous sequence of the hashed plurality of fields to generate an asset management identification key;
transmitting the asset management identification key to a blockchain; and
authenticating the device using the asset management identification key transmitted to the blockchain;
updating one of the plurality of fields with information indicating a liveness of the asset management identification key, wherein the updating comprises updating an auxiliary field of the asset management identification key to indicate that the asset management identification key is archived;
re-hashing the updated one of the plurality of fields;
re-hashing the contiguous sequence of the hashed plurality of fields including the re-hashed updated one of the plurality of fields to generate an updated asset management identification key; and
superseding the asset management identification key with the updated asset management identification key in the blockchain, wherein the superseding causes the asset management identification key to be archived in the blockchain.

11. The system of claim 10, wherein the plurality of attributes comprises personnel data, resources data, and permissions data.

12. The system of claim 11, wherein the personnel data comprises a name code, a date code, and a role code.

13. The system of claim 11, wherein the resources data comprises a Virtual Private Network (VPN) certificate.

14. The system of claim 11, wherein the permissions data comprises a user role of a role-based access control (RBAC) policy.

15. The system of claim 11, wherein the serial number of the device comprises a Media Access Control (MAC) address of the device.

16. The system of claim 10, wherein the updated one of the plurality of fields reduces access privileges of the device, and wherein the method further comprises:
initiating a subsequent authentication of the device using the updated asset management identification key, wherein the subsequent authentication fails based on the reduced access privileges of the device reflected in the updated asset management identification key.

17. The system of claim 16, wherein the liveness of the asset management identification key is selected from a group consisting of: expired, retired, and lost.

18. A computer program product comprising one or more computer readable storage media, and program instructions collectively stored on the one or more computer readable storage media, the program instructions comprising instructions configured to cause one or more processors to perform a method comprising:
populating, based on input to a front-end portal, a plurality of fields including a plurality of attributes and a serial number of a device;
hashing each of the plurality of fields;
hashing a contiguous sequence of the hashed plurality of fields to generate an asset management identification key;
transmitting the asset management identification key to a blockchain; and
authenticating the device using the asset management identification key transmitted to the blockchain;
updating one of the plurality of fields with information indicating a liveness of the asset management identification key, wherein the updating comprises updating an auxiliary field of the asset management identification key to indicate that the asset management identification key is archived;
re-hashing the updated one of the plurality of fields;
re-hashing the contiguous sequence of the hashed plurality of fields including the re-hashed updated one of the plurality of fields to generate an updated asset management identification key; and
superseding the asset management identification key with the updated asset management identification key in the blockchain, wherein the superseding causes the asset management identification key to be archived in the blockchain.

19. The computer program product of claim 18, wherein the plurality of attributes comprises personnel data, resources data, and permissions data, wherein the personnel data comprises a name code, a date code, and a role code, wherein the resources data comprises a Virtual Private Network (VPN) certificate, wherein the permissions data comprises a user role of a role-based access control (RBAC) policy, and wherein the serial number of the device comprises a Media Access Control (MAC) address of the device.

20. The computer program product of claim 18, wherein the updated one of the plurality of fields reduces access privileges of the device, and wherein the method further comprises:
   initiating a subsequent authentication of the device using the updated asset management identification key, wherein the subsequent authentication fails based on the reduced access privileges of the device reflected in the updated asset management identification key; and
   wherein the asset management identification key is archived based on a status selected from a group consisting of: expired, retired, and lost.

* * * * *